US012676378B2

(12) United States Patent
Park et al.

(10) Patent No.: US 12,676,378 B2
(45) Date of Patent: Jul. 7, 2026

(54) BATTERY MODULE AND MANUFACTURING METHOD THEREOF

(71) Applicant: LG Energy Solution, Ltd., Seoul (KR)

(72) Inventors: Subin Park, Daejeon (KR); Junkyu Park, Daejeon (KR); Junyeob Seong, Daejeon (KR); Won Kyoung Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 754 days.

(21) Appl. No.: 17/638,021

(22) PCT Filed: Mar. 2, 2021

(86) PCT No.: PCT/KR2021/002526
§ 371 (c)(1),
(2) Date: Feb. 24, 2022

(87) PCT Pub. No.: WO2021/177683
PCT Pub. Date: Sep. 10, 2021

(65) Prior Publication Data
US 2022/0278412 A1 Sep. 1, 2022

(30) Foreign Application Priority Data

Mar. 6, 2020 (KR) ......................... 10-2020-0028573
Feb. 24, 2021 (KR) ......................... 10-2021-0024497

(51) Int. Cl.
*H01M 50/264* (2021.01)
*H01M 50/211* (2021.01)
*H01M 50/244* (2021.01)

(52) U.S. Cl.
CPC ....... *H01M 50/264* (2021.01); *H01M 50/211* (2021.01); *H01M 50/244* (2021.01)

(58) Field of Classification Search
CPC ............. H01M 50/264; H01M 50/204; H01M 50/211; H01M 50/244
See application file for complete search history.

(56) References Cited

U.S. PATENT DOCUMENTS

| | | | |
|---|---|---|---|
| 2009/0092860 A1 | 4/2009 | Yamamoto et al. | |
| 2010/0021802 A1 | 1/2010 | Yang et al. | |
| (Continued) | | | |

FOREIGN PATENT DOCUMENTS

| | | |
|---|---|---|
| CN | 101395737 A | 3/2009 |
| CN | 105684188 A | 6/2016 |
| (Continued) | | |

OTHER PUBLICATIONS

International Search Report for PCTKR2021002526 Dated Jun. 14, 2021, 2 pgs.
(Continued)

*Primary Examiner* — Karie O'Neill Apicella
(74) *Attorney, Agent, or Firm* — Lerner David LLP

(57) ABSTRACT

The present disclosure relates to a battery module having a simplified structure and a method for manufacturing the same. The battery module according to an embodiment of the present disclosure includes: a battery cell stack in which a plurality of battery cells are stacked; a first frame formed of an upper surface and front and rear surfaces to cover the upper surface and front and rear surfaces of the battery cell stack; and a second frame formed of a lower surface and left and right surfaces to cover the lower surface and left and right surfaces of the battery cell stack, wherein a guide is protrusively formed on at least one of the first frame and the second frame, wherein a guide insertion part into which the guide is inserted is formed to be recessed in a portion of the second frame and/or the first frame corresponding to the guide, and wherein the first frame and the second frame are coupled to each other through a first coupling part formed by (Continued)

inserting the guide into the guide insertion part, and a second coupling part formed by welding an edge of the first frame and an edge of the second frame.

9 Claims, 6 Drawing Sheets

(56) References Cited

U.S. PATENT DOCUMENTS

| | | | | | |
|---|---|---|---|---|---|
| 2016/0248070 | A1* | 8/2016 | Ahn | .................... | H01M 50/209 |
| 2018/0138475 | A1* | 5/2018 | Seo | ................... | H01M 10/0525 |
| 2018/0138565 | A1 | 5/2018 | Lee et al. | | |
| 2019/0006647 | A1* | 1/2019 | Ryu | ................... | H01M 50/224 |
| 2019/0229313 | A1 | 7/2019 | Lee et al. | | |
| 2020/0067040 | A1 | 2/2020 | Kim et al. | | |
| 2020/0176745 | A1* | 6/2020 | Lee | .................... | H01M 50/569 |

FOREIGN PATENT DOCUMENTS

| | | | |
|---|---|---|---|
| CN | 107706325 | A | 2/2018 |
| CN | 109920944 | A | 6/2019 |
| CN | 209515783 | U | 10/2019 |
| CN | 110854319 | A | 2/2020 |
| JP | 2009099542 | A | 5/2009 |
| JP | 2011023268 | A | 2/2011 |
| JP | 2013237052 | A | 11/2013 |
| JP | 2017016799 | A | 1/2017 |
| JP | 2017076507 | A | 4/2017 |
| JP | 2018160419 | A | 10/2018 |
| KR | 200141046 | Y1 | 5/1999 |
| KR | 20130098573 | A | 9/2013 |
| KR | 20170036639 | A | 4/2017 |
| KR | 20170106897 | A | 9/2017 |
| KR | 20190012979 | A | 2/2019 |
| KR | 20190054709 | A | 5/2019 |
| KR | 102050530 | B1 | 12/2019 |
| KR | 20200021609 | A | 3/2020 |

OTHER PUBLICATIONS

Extended European Search Report including Written Opinion for Application No. 21765260.1 dated May 29, 2024, pp. 1-8.
Search Report dated Aug. 17, 2023 from the Office Action for Chinese Application No. 202180005019.3 issued Aug. 19, 2023, 3 pages.

* cited by examiner

【FIG. 1】
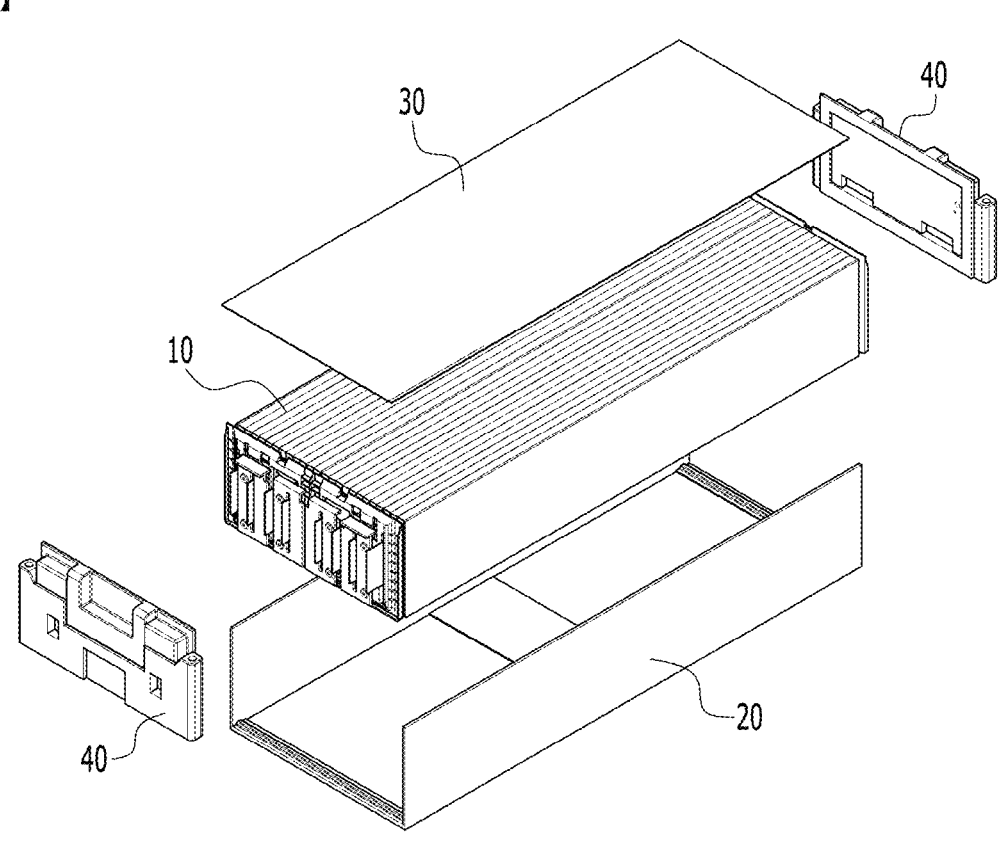

【FIG. 2】
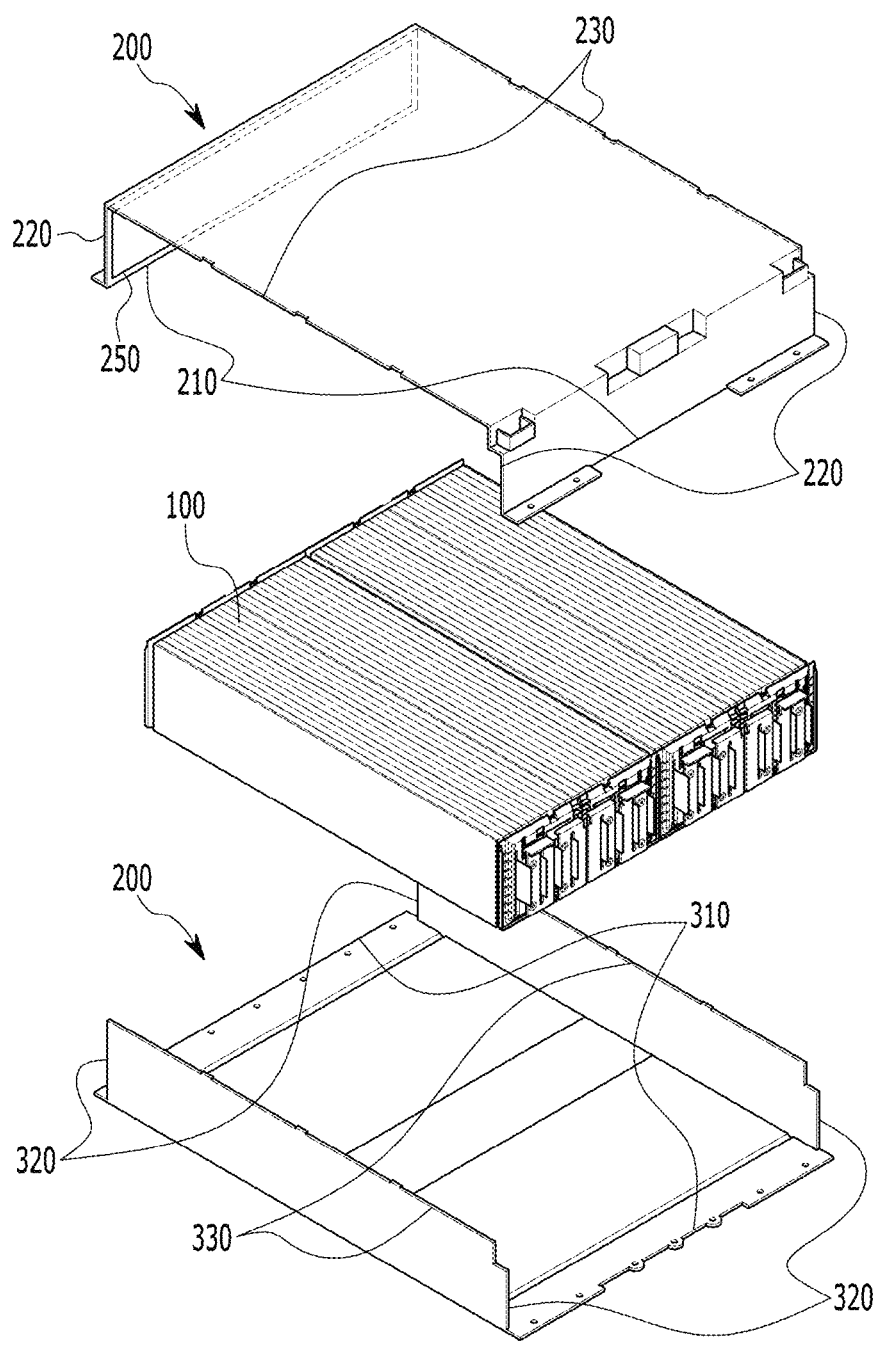

【FIG. 3】
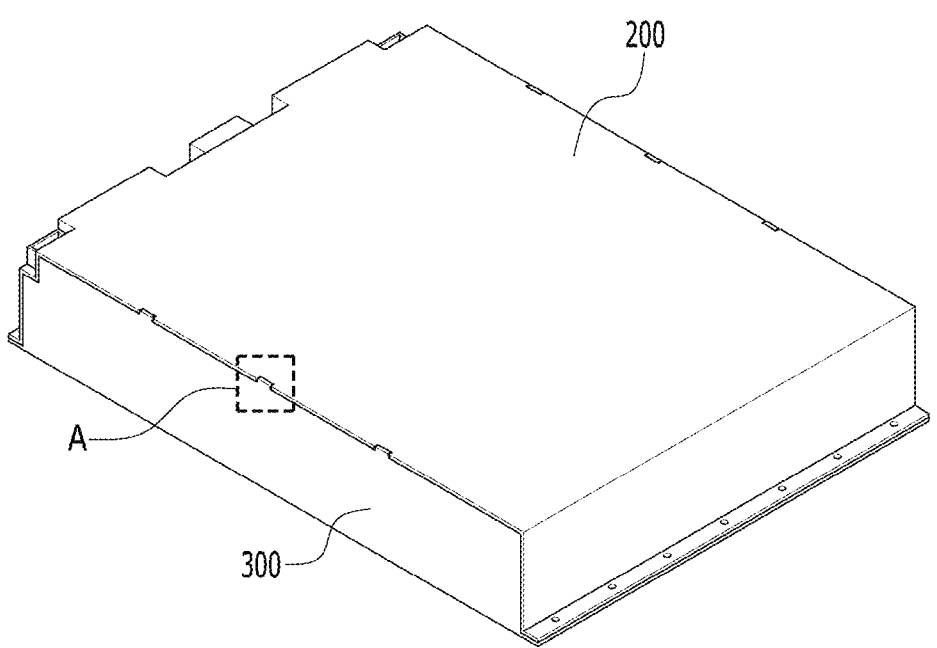
【FIG. 4】
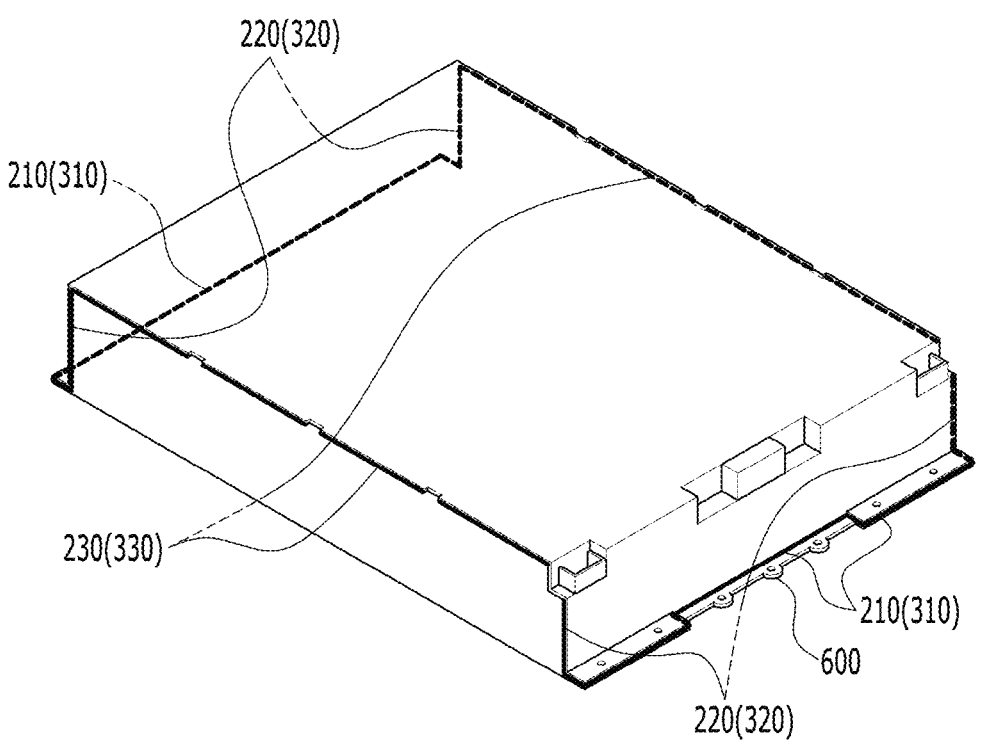

【FIG. 5】
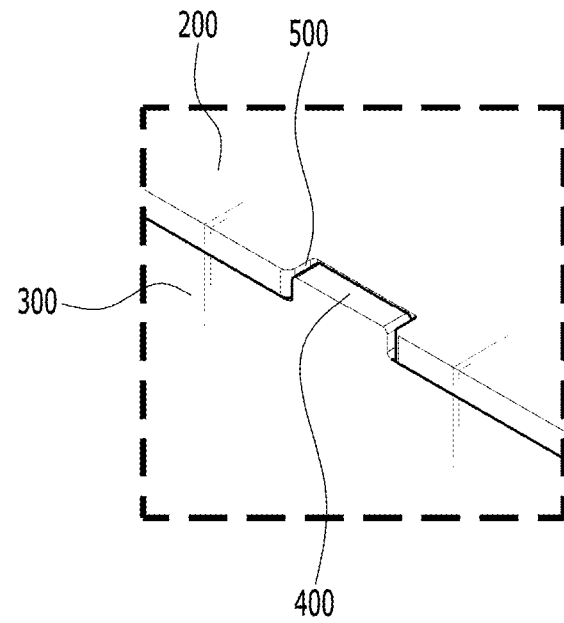
【FIG. 6】
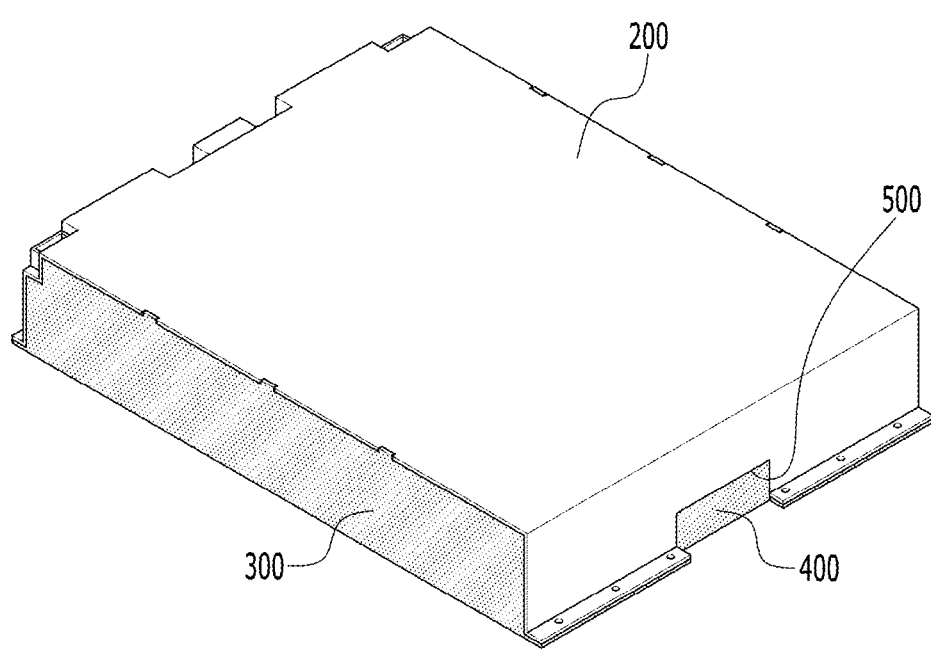

【FIG. 7】
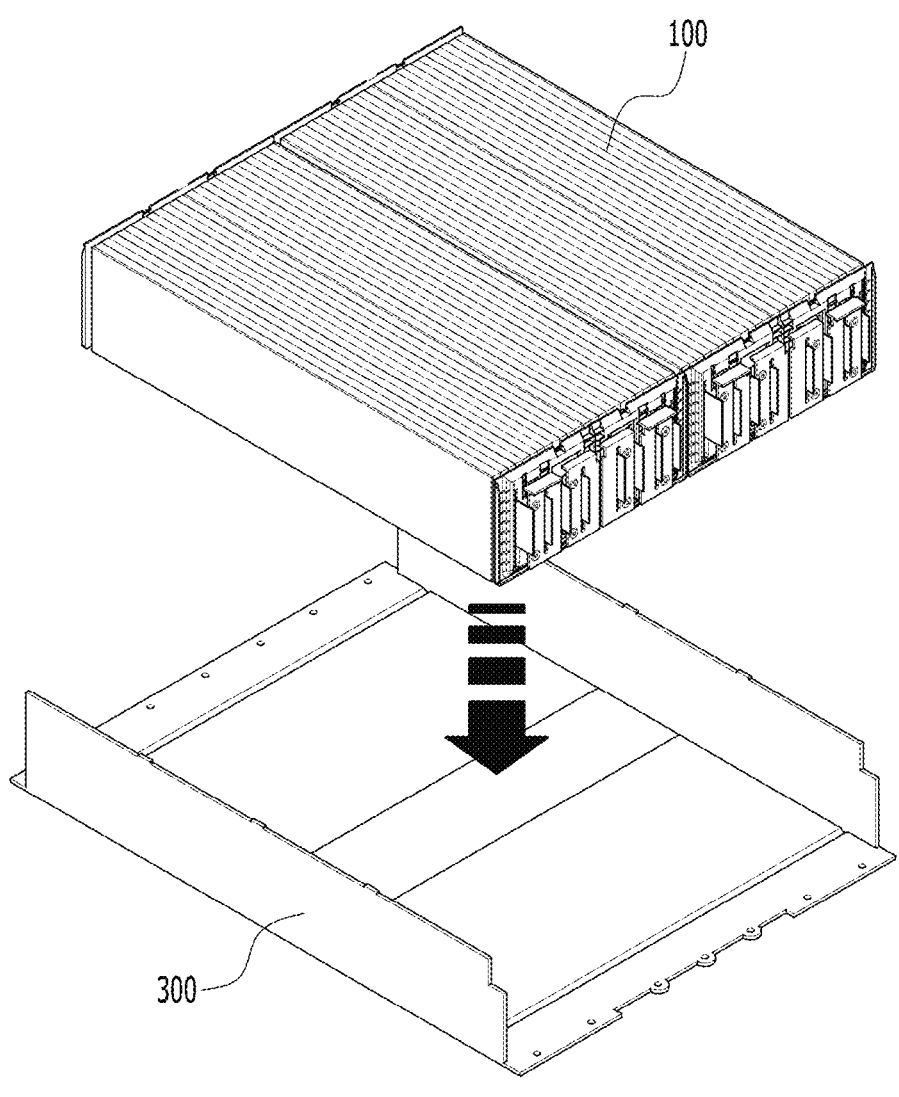

【FIG. 8】
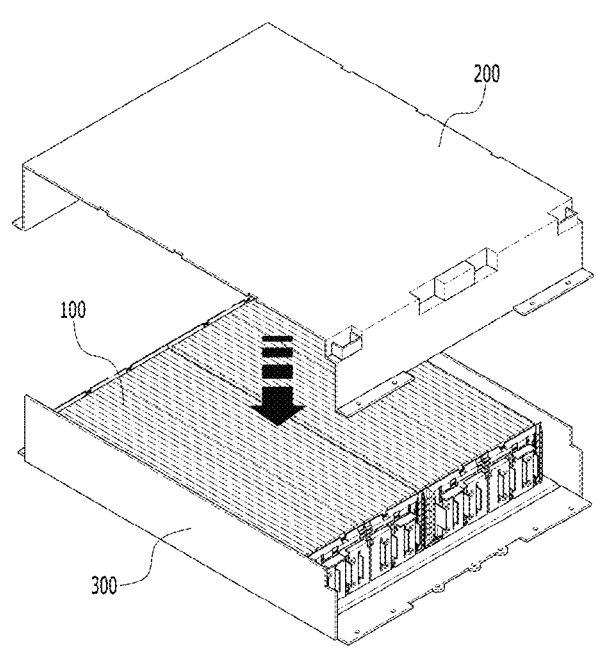
【FIG. 9】
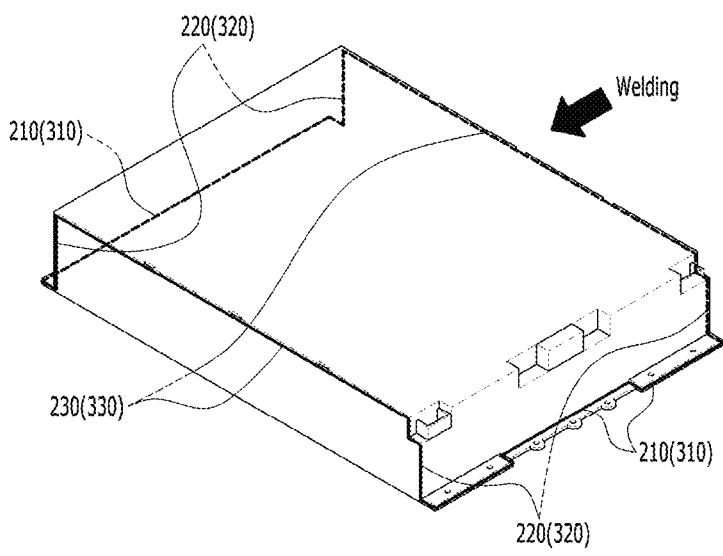

BATTERY MODULE AND MANUFACTURING METHOD THEREOF

CROSS-REFERENCE TO RELATED APPLICATIONS

The present application is a national stage entry under 35 U.S.C. § 371 of International Patent Application No.: PCT/KR2021/002526, filed on Mar. 2, 2021, published in Korean, which claims priority to Korean Patent Application No. 10-2020-0028573 filed on Mar. 6, 2020 and Korean Patent Application No. 10-2021-0024497 filed on Feb. 24, 2021, the entire contents of which are hereby incorporated by reference herein.

TECHNICAL FIELD

The present disclosure relates to a battery module and a method for manufacturing the same, and more particularly, to a battery module having a simplified structure and a method for manufacturing the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use. Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series or in parallel.

Meanwhile, when a plurality of battery cells are connected in series/parallel to configure a battery pack, a method of configuring a battery module composed of at least one battery cell and then adding other components to at least one battery module to configure a battery pack is common.

The battery module may include a battery cell stack in which a plurality of battery cells are stacked, and a frame for housing the battery cell stack.

FIG. 1 is a diagram illustrating a battery module including a U-shaped frame according to the prior art.

Referring to FIG. 1, conventionally, frames covering the battery cell stack 10 are composed of a U-shaped frame 20 for covering the lower surface and both side surfaces of the battery cell stack 10, an upper plate 30 for covering the upper surface of the battery cell stack 10, and an end plate 40 for covering the front and rear surfaces of the battery cell stack 10. In this way, as the frame structure for protecting the battery cell stack 10 is formed by a multi-part structure of a U-shaped frame 20, an upper plate 30, and two end plates 40, an assembly process for assembling respective parts is required for each part, and the material is different for each part, and thus, there is a risk that the rigidity of the battery module may be reduced.

DETAILED DESCRIPTION OF THE INVENTION

Technical Problem

It is an object of the present disclosure to provide a battery module having a simplified structure and a method for manufacturing the same.

The objects of the present disclosure are not limited to the aforementioned objects, and other objects which are not described herein should be clearly understood by those skilled in the art from the following detailed description.

Technical Solution

In order to achieve the above object, according to one embodiment of the present disclosure, there is provided a battery module comprising: a battery cell stack in which a plurality of battery cells are stacked; a first frame formed of an upper surface and front and rear surfaces to cover the upper surface and front and rear surfaces of the battery cell stack; and a second frame formed of a lower surface and left and right surfaces to cover the lower surface and left and right surfaces of the battery cell stack, wherein a guide is protrusively formed on at least one of the first frame and the second frame, wherein a guide insertion part into which the guide is inserted is formed to be recessed in a portion of the second frame and/or the first frame corresponding to the guide, and wherein the first frame and the second frame are coupled to each other through a first coupling part formed by inserting the guide into the guide insertion part, and a second coupling part formed by welding an edge of the first frame and an edge of the second frame.

In order to achieve the above object, according to another embodiment of the present disclosure, there is provided a method for manufacturing a battery module, the method comprising the steps of: assembling a battery cell stack on the lower surface of the lower frame formed of the lower surface and left and right surfaces; assembling an upper frame formed of an upper surface and front and rear surfaces to a lower frame to which the battery cell stack is assembled; and weld-coupling the upper frame and the lower frame, wherein in the step of assembling the upper frame to the lower frame, the upper frame is assembled to the lower frame according to a guide that is protrusively formed on at least one of the upper frame and the lower frame.

The edges of the first frame, and the edges of the second frame located at a portion corresponding to the edges of the first frame may be weld-coupled to each other.

The guide may be formed at the upper end edge of the left and right surfaces of the second frame, and the guide insertion part is formed at both side ends of the upper surface of the first frame.

The guide may be formed at the front and rear end edges of the lower surface of the second frame, and the guide insertion part may be formed at the lower ends of front and rear surfaces of the first frame.

The lower surface front and rear ends of the lower surface of the second frame may be respectively weld-coupled to the lower ends of front and rear surfaces of the first frame, the front and rear ends of the left and right surfaces of the second frame may be respectively weld-coupled to both side ends of the front and rear surfaces of the first frame, and the upper ends of the left and right surfaces of the second frame may be respectively weld-coupled to both side ends of the upper surface of the first frame.

The first frame and the second frame may be formed of the same material.

The upper frame and the lower frame may be manufactured by a press method.

In the step of weld-coupling the upper frame and the lower frame, the front and rear ends of the lower surface of the lower frame and the lower ends of front and rear surfaces of the upper frame, the front and rear ends of the left and right surfaces of the lower frame and both side ends of the front and rear surfaces of the upper frame, and the upper ends of the left and right surfaces of the lower frame and both side ends of the upper surface of the upper frame may be welded at once.

Advantageous Effects

A battery module and a method for manufacturing the same according to an embodiment of the present disclosure adopts a structure that covers the battery cell stack with only two frames in the conventional multi-part frame structure, thereby providing the effects of reducing the number of frame parts, reducing the assembling process of frame parts, improving productivity, and increasing the rigidity of the frame through a press method.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a diagram illustrating a battery module including a U-shaped frame according to the prior art;

FIG. 2 is an exploded perspective view illustrating a battery module according to an embodiment of the present disclosure;

FIG. 3 is a diagram illustrating a state in which the battery module according to an embodiment of the present disclosure is assembled;

FIG. 4 is a diagram illustrating a portion to which the first and second frames are welded according to an embodiment of the present disclosure;

FIG. 5 is a section A in FIG. 3 which is a diagram illustrating a guide according to an embodiment of the present disclosure;

FIG. 6 is a diagram illustrating a battery module in which a guide is formed according to another embodiment of the present disclosure;

FIG. 7 is a diagram illustrating a state in which the battery cell stack according to an embodiment of the present disclosure is assembled to the lower frame;

FIG. 8 is a diagram illustrating a state in which the upper frame is assembled to the structure assembled through FIG. 7; and FIG. 9 is a diagram illustrating a state in which the upper frame and the lower frame are coupled by welding the structure assembled through FIG. 8.

DETAILED DESCRIPTION OF THE EMBODIMENTS

It should be appreciated that the exemplary embodiments, which will be described below, are illustratively described to assist in the understanding of the present disclosure, and the present disclosure can be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, movements, constitutional elements, parts or combinations thereof, but it should be understood that they do not preclude a possibility of existence or addition of one or more other features, numbers, steps, movements, constitutional elements, parts or combinations thereof.

Hereinafter, the battery module according to embodiments of the present disclosure will be described with reference to FIGS. 2 to 6.

FIG. 2 is an exploded perspective view illustrating a battery module according to an embodiment of the present disclosure. FIG. 3 is a diagram illustrating a state in which the battery module according to an embodiment of the present disclosure is assembled. FIG. 4 is a diagram illustrating a portion to which the first and second frames are welded according to an embodiment of the present disclosure. FIG. 5 is a section A in FIG. 4 which is a diagram illustrating a guide according to an embodiment of the present disclosure. FIG. 6 is a diagram illustrating a battery module in which a guide is formed according to another embodiment of the present disclosure.

A battery module comprising:

Referring to FIGS. 2 to 6, a battery module according to an embodiment of the present disclosure includes a battery cell stack 100 in which a plurality of battery cells are stacked, a first frame 200 formed of an upper surface and front and rear surfaces to cover the upper surface and front and rear surfaces of the battery cell stack 100, and a second frame 300 formed of a lower surface and left and right surfaces to cover the lower surface and left and right surfaces of the battery cell stack 100, wherein a guide 400 is protrusively formed on at least one of the first frame 200 and the second frame 300, a guide insertion part 500 into which the guide 400 is inserted is formed to be recessed in a portion of the second frame 300 and/or the first frame 200 corresponding to the guide 400, the guide 400 is inserted into the guide insertion part 500, and the first frame 200 and the second frame 300 are coupled by welding to each other.

The battery cell is a secondary battery and may be configured as a pouch-type secondary battery. Such a battery cell may be composed of a plurality of cells, and the plurality of battery cells can be stacked together so as to be electrically connected to each other, thereby forming the battery cell stack 100. The plurality of battery cells may include an electrode assembly, a cell case, and an electrode lead protruding from the electrode assembly, respectively.

According to an embodiment of the present disclosure, the battery module includes the first and second frames 200 and 300 for covering the battery cell stack 100. The first frame 200 is formed so as to cover the upper surface and front and rear surfaces of the battery cell stack 100, and the second frame 300 is formed so as to cover the lower surface and left and right surfaces of the battery cell stack 100.

Conventionally, the frame covering the battery cell stack has a structure that covers the battery cell stack by assembling plural parts of a U-shaped frame, an upper plate, and two end plates, but the conventional structure of coupling plural parts has a drawback that the rigidity of the frame may be decreased, all of a plurality of parts must be assembled, the assembly line at the time of welding or bolt assembling becomes long, and the assembly process becomes complicated.

Thus, according to an embodiment of the present disclosure, a battery module structure is formed so as to cover the battery cell stack 100 only with the two first and second frames 200 and 300, thereby integrating and simplifying the frame structure, reducing the number of frame parts, reducing the assembly process of frame parts, and dramatically improving the problem of poor quality that may occur in a complicated assembly process.

In addition, the first and second frames 200 and 300 according to an embodiment of the present disclosure may be formed by a press method, and the first and second frames 200 and 300 may be formed of the same material. As a result, when manufacturing the frame parts, the first and second frames 200 and 300 can be manufactured by a single method, the manufacturing process can be simplified, and quality defects can be reduced.

The battery module according to the embodiment of the present disclosure may further include an insulating member 250 located between the first frame 200 and the battery cell stack 100. The insulating member 250 may be formed by insulation-coating on the first frame 200, or may be an insulating cover integrally coupled to the battery cell stack 100. The insulating member 250 may serve to complement the insulating properties of the electrode leads of the battery cell stack 100.

According to an embodiment of the present disclosure, the edges of the first frame 200, and the edges of the second frame 300 located at a portion corresponding to the edges of the first frame 200 can be coupled by welding to each other. In more detail, referring to FIG. 4, the front and rear ends 310 of the lower surface of the second frame 300 are respectively weld-couple to the front and rear ends of the lower surface lower ends 210 of the first frame 200, the front and rear ends 320 of left and right surfaces of the second frame 300 are respectively weld-coupled to the both side ends 220 of the front and rear surfaces of the first frame 200, and the upper ends 330 of left and right surfaces of the second frame 300 may be respectively weld-coupled to both side ends 230 of the upper surface of the first frame 200. According to the embodiment of the present disclosure, the pack mounting structure 600 may be formed on the lower ends 210 of front and rear surfaces of the first frame 200. The pack mounting structure 600 may serve as a coupling portion when the battery module according to the embodiment of the present disclosure is mounted on the battery pack.

Referring to FIG. 5, the guide 400 according to an embodiment of the present disclosure is formed at the upper end edge of left and right surfaces of the second frame 300, and the guide insertion part 500 may be formed at both side ends of the upper surface of the first frame 200. Therefore, when assembling the first frame 200 to the second frame 300 to which the battery cell stack 100 is assembled, the first frame 200 can be assembled to the second frame 300 in accordance with the guide 400 formed in the second frame 300.

Referring to FIG. 6, the guide 400 according to another embodiment of the present disclosure is formed at the front and rear edges of the lower surface of the second frame 300, and a guide insertion part 500 may be formed at the lower ends of front and rear surfaces of the first frame 200. Therefore, when the first frame 200 is assembled to the second frame 300 to which the battery cell stack 100 is assembled, the first frame 200 can be assembled to the second frame 300 in accordance with the guide 400 formed on the second frame 300.

According to the embodiment of the present disclosure, the first frame 200 and the second frame 300 are coupled to each other through a first coupling part formed by inserting the guide 400 into the guide insertion part 500, and a second coupling part formed by welding an edge of the first frame 200 and an edge of the second frame 300, thereby capable of optimizing the weld sections and the weld lengths. In addition, the coupling strength can be improved by combining different coupling methods. Further, according to the embodiment of the present disclosure, the welding area between the end plate and the frame member, which is structurally fragile in the existing stress situation, can be omitted, which has the advantage of complementing the broken portion.

Hereinafter, a method of assembling a battery module according to an embodiment of the present disclosure will be described with reference to FIGS. 7 to 9.

FIG. 7 is a diagram illustrating a state in which the battery cell stack according to an embodiment of the present disclosure is assembled to the lower frame. FIG. 8 is a diagram illustrating a state in which the upper frame is assembled to the structure assembled through FIG. 7. FIG. 9 is a diagram illustrating a state in which the upper frame and the lower frame are coupled by welding the structure assembled through FIG. 8.

Referring to FIGS. 7 to 9, a method for manufacturing a battery module according to an embodiment of the present disclosure includes the steps of: assembling a battery cell stack 100 on the lower surface of the lower frame 300 (FIG. 7), assembling an upper frame 200 to a lower frame 300 to which the battery cell stack 100 is assembled (FIG. 8), and weld-coupling the upper frame 200 and the lower frame 300, wherein in the step of assembling the upper frame 200 to the lower frame 300, the upper frame 200 is assembled to the lower frame 300 in accordance with a guide 400 that is protrusively formed on at least one of the upper frame 200 and/or the lower frame 300.

The upper frame 200 and the lower frame 300 are assembled in accordance with the guide 400 formed in the upper frame 200 and/or the lower frame 300, thereby capable of improving the assembly accuracy, and enhancing the assembly rigidity by the protrusively formed guide 400. The guide 400 can be inserted and fixed to the guide insertion part 500 formed to recessed in the edge corresponding to the frame in which the guide is formed, thereby coupling the upper frame 200 and the lower frame 300 to each other.

According to an embodiment of the present disclosure, in the step of weld-coupling the upper frame 200 and the lower frame 300, the front and rear ends 310 of the lower surface of the lower frame 300 and the lower ends 210 of front and rear surfaces of the upper frame 200, the front and rear ends 320 of left and right surfaces of the lower frame 300 and both side ends 220 of front and rear surfaces of the upper frame 200, and the upper ends 330 of left and right surfaces of the lower frame 300 and both side ends 230 of the upper surface of the upper frame 200 are welded at once.

Conventionally, there was a problem that the frame structure has to be assembled through a complicated assembling process in which a battery cell stack is inserted into an interior of a U-shaped frame, an upper plate is assembled on an upper side of the battery cell stack, the upper plate and the U-shaped frame are welded to each other, a first end plate is assembled, the first end plate, the U-shaped frame and the upper plate are welded to each other, a second end plate is assembled, and the second end plate, the U-shaped frame and the upper plate are welded to each other.

However, according to an embodiment of the present disclosure, because the battery module has a structure capable of covering the battery cell stack 100 with only two frame parts of the first and second frames 200 and 300, the battery module frame structure can be formed through a simple assembling process of inserting the battery cell stack 100 into the lower frame 300, assembling the upper frame 200 to the lower frame 300, and then welding the upper and lower frames 200 and 300, whereby a welding process can be simplified as compared with the prior art and the manufacturing process can be simplified, thereby reducing a defect rate of products The above-mentioned battery module can be included in the battery pack. The battery pack may have a structure in which one or more of the battery modules according to the embodiment of the present disclosure are gathered, and packed together with a battery management system (BMS) and a cooling device that control and manage battery's temperature, voltage, etc. The battery pack can be applied to various devices. Such a device may be applied to a vehicle such as an electric bicycle, an electric vehicle, or a hybrid vehicle, but the present disclosure is not limited thereto, and is applicable to various devices that can use a battery module, which also belongs to the scope of the present disclosure.

Although preferred embodiments of the present disclosure have been shown and described above, the scope of the present disclosure is not limited thereto, and numerous other modifications and embodiments can be devised by those skilled in the art that will fall within the spirit and scope of the principles of the invention described in the appended claims. Further, these modified embodiments should not be understood individually from the technical spirit or perspective of the present disclosure.

DESCRIPTION OF REFERENCE NUMERALS

100: battery cell stack
200: first frame (upper frame)
210: lower ends of front and rear surfaces of first frame
220: both side ends of front and rear surfaces of first frame
230: both side ends of the upper surface of first frame
300: second frame (lower frame)
310: front and rear ends of the lower surface of second frame
320: front and rear ends of left and right surfaces of second frame
330: upper ends of left and right surfaces of second frame
400: guide
500: guide insertion unit

The invention claimed is:

1. A battery module comprising:
a battery cell stack in which a plurality of battery cells are stacked;
a first frame that is a first single piece unitary structure having an upper surface and front and rear surfaces covering an upper surface and front and rear surfaces of the battery cell stack, respectively; and
a second frame that is a second single piece unitary structure having a lower surface and left and right surfaces covering a lower surface and left and right surfaces of the battery cell stack, respectively,
wherein a first one of the first frame or the second frame has a guide protrusively extending therefrom,
wherein a second one of the first frame or the second frame has a guide insertion part recessed into a portion thereof, the guide insertion part having a shape corresponding to a shape of the guide, so that the guide fits into the guide insertion part, the guide and the guide insertion part together being a first coupling part,
wherein the first frame and the second frame are coupled to each other by combining different coupling methods,
wherein the first frame and the second frame are coupled to each other by the first coupling part and a second coupling part that is a welding of at least one of a plurality of edges of the first frame to at least one of a plurality of corresponding edges of the second frame,
wherein the battery cell stack is covered only with the first frame and the second frame,
wherein all of the edges of the first frame, and all of the edges of the second frame located adjacent to corresponding ones of the edges of the first frame are weld-coupled to each other, and
wherein the guide includes a plurality of guides located along at least one edge of the first one of the first frame or the second frame, and the guide insertion part includes a plurality of guide insertion parts having shapes corresponding to shapes of the plurality of guides.

2. The battery module of claim 1, wherein the guide is a first guide located at an upper edge of the left surface of the second frame and the guide insertion part is a first guide insertion part located at a left side edge of the upper surface of the first frame, the second frame has a second guide located at an upper edge of the right surface of the second frame, the first frame has a second guide insertion part located at a right side edge of the upper surface of the first frame, and the second guide fits into the second guide insertion part.

3. The battery module of claim 1, wherein the guide is a first guide located at a front edge of the lower surface of the second frame and the guide insertion part is a first guide insertion part located at a lower edge of the front surface of the first frame, the second frame has a second guide located at a rear edge of the lower surface of the second frame, the first frame has a second guide insertion part located at a lower edge of the rear surface of the first frame, and the second guide fits into the second guide insertion part.

4. The battery module of claim 1, wherein:
front and rear edges of the lower surface of the second frame are respectively weld-coupled to lower edges of front and rear surfaces of the first frame,
front and rear edges of the left and right surfaces of the second frame are respectively weld-coupled to opposite side edges of the front and rear surfaces of the first frame, and
upper edges of the left and right surfaces of the second frame are respectively weld-coupled to opposite side edges of the upper surface of the first frame.

5. The battery module of claim 1, wherein the first frame and the second frame are formed of a same material.

6. A method for manufacturing a battery module, the method comprising:
assembling a battery cell stack on a lower surface of a lower frame having the lower surface and left and right surfaces, the lower frame being a lower single piece unitary structure;

assembling an upper frame having an upper surface and front and rear surfaces to the lower frame on which the battery cell stack is assembled, the upper frame being an upper single piece unitary structure, the battery cell stack being covered only with the lower frame and the upper frame; and weld-coupling edges of the upper frame and edges of the lower frame to one another, such that all of the edges of the lower frame, and all of the edges of the upper frame located adjacent to corresponding ones of the edges of the lower frame are weld-coupled to each other, wherein during the assembling of the upper frame to the lower frame, the upper frame is assembled to the lower frame such that a guide that protrusively extends from a first one of the upper frame or the lower frame fits into a recess extending into a second one of the upper frame or the lower frame, wherein the lower frame and the upper frame are coupled to each other by combining different coupling methods, and wherein the guide includes a plurality of guides located along at least one edge of the first one of the upper frame or the lower frame, and the recess includes a plurality of recesses having shapes corresponding to shapes of the plurality of guides.

7. The method of claim 6, wherein the upper frame and the lower frame are each manufactured by a press method.

8. The method of claim 6, wherein during the weld-coupling of the upper frame and the lower frame, front and rear edges of the lower surface of the lower frame and lower edges of the front and rear surfaces of the upper frame, front and rear edges of the left and right surfaces of the lower frame and opposite side edges of the front and rear surfaces of the upper frame, and upper edges of the left and right surfaces of the lower frame and opposite side edges of the upper surface of the upper frame are simultaneously welded to one another.

9. A battery pack comprising the battery module of claim 1.

* * * * *